UNITED STATES PATENT OFFICE.

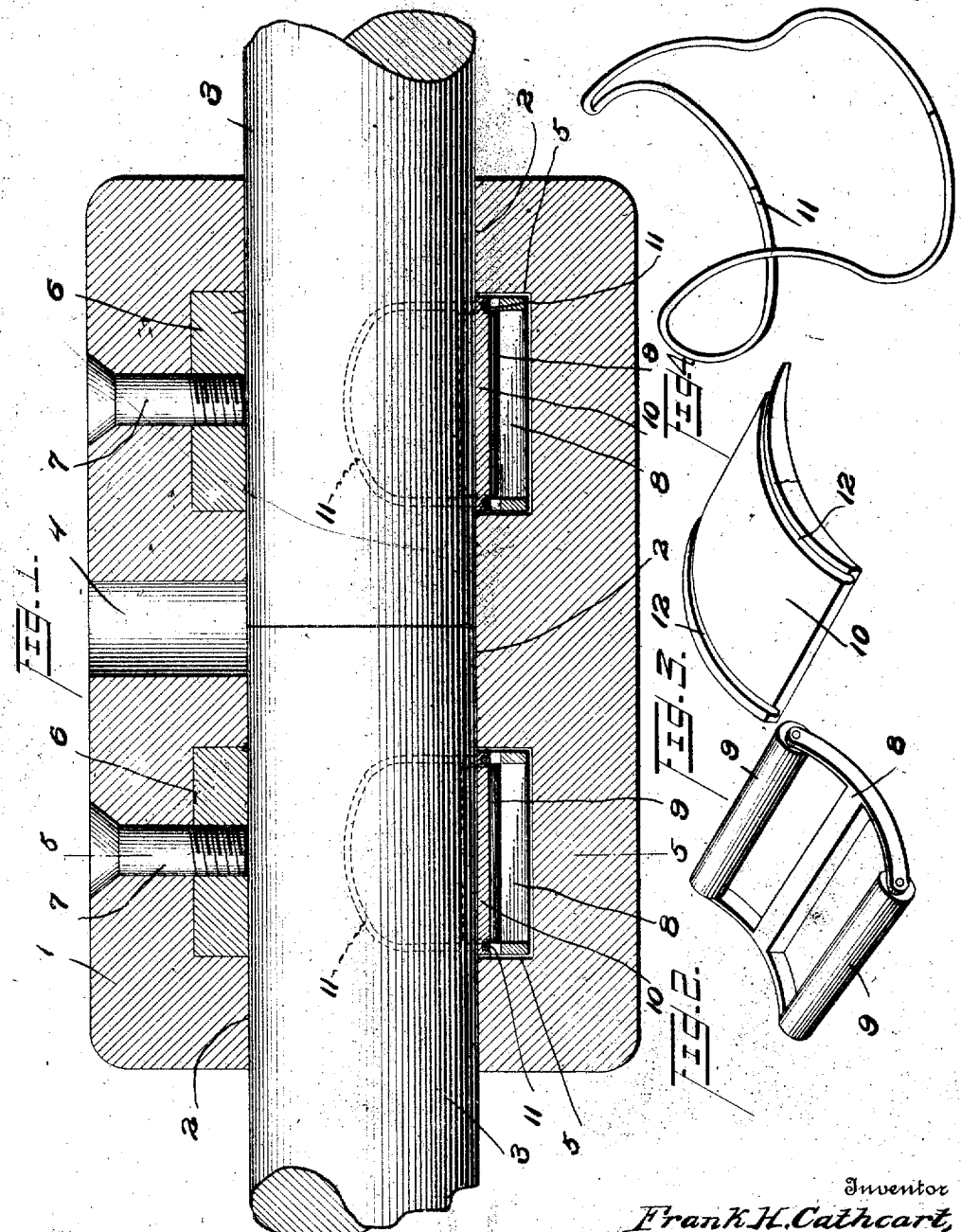

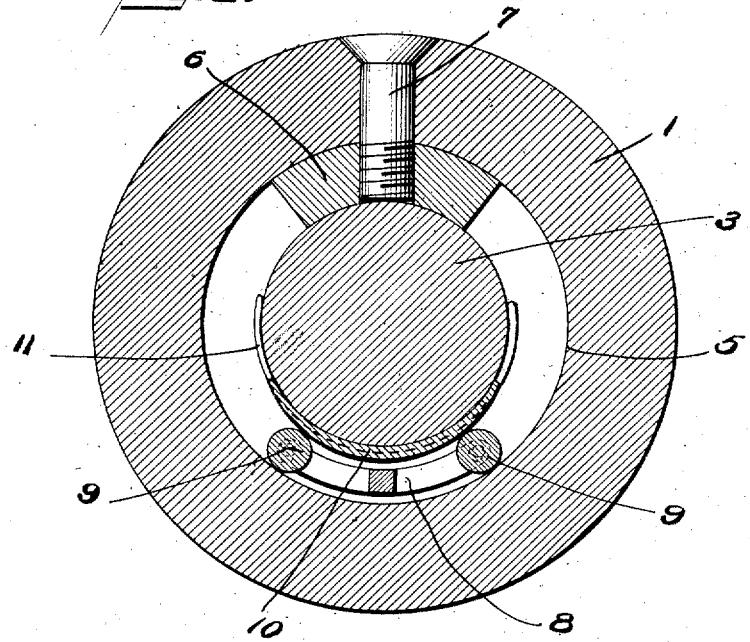
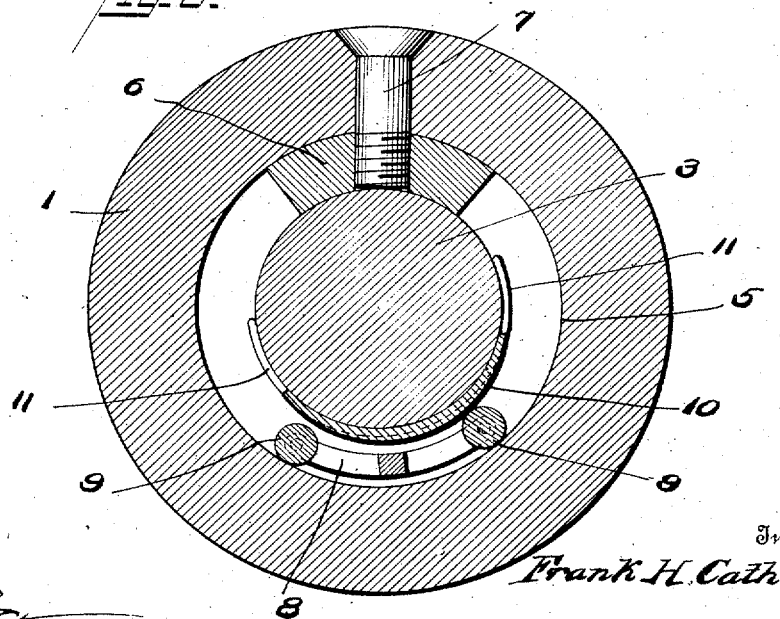

FRANK H. CATHCART, OF TRENTON, NEW JERSEY, ASSIGNOR TO AUTOMATIC SHAFT COUPLING CO., OF ALEXANDRIA, VIRGINIA, A CORPORATION OF DELAWARE.

SHAFT-COUPLING.

1,208,481.  Specification of Letters Patent.  Patented Dec. 12, 1916.

Application filed May 15, 1912. Serial No. 697,360.

*To all whom it may concern:*

Be it known that I, FRANK H. CATHCART, a citizen of the United States, residing at Trenton, in the county of Mercer and State of New Jersey, have invented certain new and useful Improvements in Shaft-Couplings, of which the following is a specification.

My invention relates to improvements in shaft couplings, the object of the invention being to provide improved means for locking the adjacent ends of alined shafts, which rigidly secures the shafts to turn together, yet may be quickly and easily operated to uncouple the shafts.

A further object is to provide an improved shell with alined bearings for the shafts and recesses concentric with the shaft, and in which wedge plates are provided which coöperate with devices in the recesses to lock the shafts and shell together.

A further object is to provide a shaft coupling of this character which provides a bearing surface throughout the length of the shell against which the shafts are pressed by the action of wedge plates and movable devices in the recesses.

With these, and other objects in view, the invention consists in certain novel features of construction and combinations and arrangements of parts, as will be more fully hereinafter described and pointed out in the claims.

In the accompanying drawings: Figure 1, is a view in longitudinal section illustrating my improvements. Fig. 2, is a detail perspective view of one of the frames 8. Fig. 3, is an inverted perspective view of one of the wedge plates 10. Fig. 4, is a perspective view of one of the wedge plate holding springs. Fig. 5, is a view in cross section on the line 5—5 of Fig. 1, showing the shaft in its uncoupled position, and Fig. 6, is a similar view showing the shaft locked to turn with the shell.

1, represents my improved shell which is of such dimensions as to properly perform its function to give it the necessary strength and durability. This shell is provided at its ends, and at its center, with alined bearings 2 for the reception of shafts 3, an opening 4 being provided in the shell through which the ends of shafts 3 may be observed to properly position the shell relative thereto. This opening also accommodates an instrument by means of which the shell may be turned if desired.

Between the bearings 2, at both ends of the shell, the latter is made with concentric recesses 5. In other words, these recesses 5 are circular in form with their walls concentric with the shafts 3, and in the upper portions of these recesses 5, bearing blocks 6 are secured by screws 7 or other suitable means, so that the shafts have a bearing throughout the shell in the upper portion of the shell to resist the pressure of the locking means now to be described. In the lower portions of the recesses 5, frames 8 are located and support at their ends, rollers 9. These rollers 9 are of maximum strength and are of greater diameter than the thickness of frame 8, so that the frame does not come in contact with the wall of the recess.

Between each frame 8 and the shaft section 3, I locate an improved wedge plate 10. This wedge plate, as seen in Fig. 3, is curved in the arc of a circle circumferentially. Its upper face is curved concentrically with the curvature of the shaft so as to snugly fit the shaft while the lower face of the wedge plate is curved in a smaller arc of a circle, so that the plate is thickest at its center and tapers toward both ends.

To insure instantaneous clutching or gripping action when the shaft or the shell are turned relative to each other, I provide means for holding the wedge plate against the shaft so as to compel it to move therewith in the initial turning movement of the shaft. This means may, of course, be varied, but I have illustrated a simple form in which a wire spring 11 is bent so as to grip opposite sides of the shaft and extend around the shaft a trifle more than one-half of the shaft, and at the intermediate portions of said wire spring, they are positioned in grooves 12 in the bottom of wedge plate 10 and may be secured therein in any approved manner. This spring performs the function of compelling the wedge to move with the shaft so as to prevent any possibility of slipping one part against the other. While the wedge plate will operate without this spring, the latter improves the operation because it prevents any delay in the clutching action.

Fig. 5 shows the position of the wedge plate when idle. In other words, when in this position, the shaft is not locked to the shell. When the shaft or shell is given a partial turn, the wedge plate 10 is moved circumferentially between the shaft, and one of the rollers 9, and as this wedge plate increases in thickness from its ends to its center, this movement causes the plate to wedge between a roller 9 and shaft 3, securely locking shaft and shell together. A turning movement in the opposite direction tends to release this locking engagement, and as the plate is similarly shaped at both ends, a turning movement of the shaft or shell in either direction will lock the parts together. It will therefore be seen that my improved shaft coupling relies upon the eccentric surface of the wedge plate which moves between the rollers 9, and by reason of the fact that these rollers 9 move against the wall of the concentric recess 5, a firm gripping action is obtained. Furthermore, it will be noted that the shafts 3 have a bearing directly opposite the point of pressure exerted by the wedge plates. In other words, the blocks 6 are so positioned that when the wedges tend to press the shafts, these blocks 6 will sustain the pressure. This is an important feature, because it provides a rigid backing for the shafts against the pressure of the wedge plates.

It will be noted that each of the shafts is coupled to the shell by precisely the same mechanism, and that the locking action is had either by turning the shaft or the shell, or in other words, moving these parts in opposite directions or holding one while the other moves. Therefore, when one shaft is turned and the shell held, such shaft will be locked to the shell, and a continued turning movement of the shell will lock the other shaft to the shell, so that the shafts will be coupled. Hence these shafts may be readily coupled by moving the shell in one direction, and released by moving the shell in the other direction. The operation is almost instantaneous, and shafting may be coupled and uncoupled quickly and easily.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A shaft coupling comprising a shell having a cylindrical bore, and adapted to receive a shaft therein of appreciably less diameter than the internal diameter of the shell, said shell having a shaft engaging enlargement extending inwardly and spaced beyond the inner surface of the shell, a roller in the shell, and a wedge located between the roller and the shaft when the shaft is in the shell, substantially as described.

2. A shaft coupling comprising a shell having bearings therein for a shaft, and having a concentric recess therein with an inwardly projecting enlargement in the recessed portion against which the shaft is adapted to bear, a roller in said recess, and a wedge located between the roller and shaft when the shaft is in the shell, whereby the movement of the wedge circumferentially tends to press the said enlargement against the shaft, substantially as described.

3. A shaft coupling comprising a shell having bearings therein to receive a shaft, said shell having a recess therein, a frame in said recess, rollers at the ends of the frame, and a wedge plate interposed between said frame and the shaft, substantially as described.

4. A shaft coupling comprising a shell having bearings therein to receive a shaft, and said shell having a recess therein concentric with the bearings, a frame in the recess, rollers in the ends of the frame, and a wedge plate fitting the shaft and adapted to be moved circumferentially to wedge between the rollers of the frame and the shaft, substantially as described.

5. A shaft coupling comprising a shell having a cylindrical bore, and adapted to receive a shaft therein of appreciably less diameter than the internal diameter of the shell, said shell having a shaft engaging surface extending inwardly beyond the inner surface of the shell, two rollers in the shell, and a wedge located between the rollers and the shaft, said wedge curved in the arc of a circle widest at its center and tapering to both ends, substantially as described.

6. A shaft coupling comprising a shell having bearings therein for a shaft, and having a concentric recess therein with an inwardly projecting surface in the recessed portion against which the shaft is adapted to bear, two rollers in the shell, and a wedge located between the rollers and the shaft, said wedge curved in the arc of a circle widest at its center and tapering to both ends, substantially as described.

7. A shaft coupling comprising a shell having bearings therein to receive a shaft, said shell having a recess therein, a frame in said recess, rollers at the ends of the frame, a wedge plate interposed between said frame and the shaft when the latter is in position in the coupling, and means frictionally holding said wedge plate against the shaft, substantially as described.

8. A shaft coupling comprising a shell having bearings therein to receive a shaft, and said shell having a recess therein concentric with the bearings, a shaft in said bearings, a frame in the recess, rollers in the ends of the frame, a wedge plate fitting the shaft and adapted to be moved circumferentially to wedge between the rollers of the frame and the shaft, and means frictionally holding said wedge plate against the shaft, substantially as described.

9. A shaft coupling comprising a shell having bearings therein to receive a shaft, said shell having a recess therein between the bearings, a shaft in said bearings, a wedge plate in said recess, a frame in the recess, rollers in the ends of the frame adapted to engage the wedge plate and compel the latter to lock the shaft and shell together when the wedge plate is moved circumferentially, said wedge plate having longitudinal grooves in its outer face, a wire spring located in said grooves, and bent at its ends gripping the shaft, substantially as described.

10. A shaft coupling comprising a shell having a recess therein, a shaft in the bearings, a device in the recess, a wedge plate located between the device and the shaft, said wedge plate having longitudinal grooves in its outer face, a wire spring located in said grooves, and bent at its ends gripping the shaft, substantially as described.

11. A shaft coupling comprising a shell having bearings therein to receive a shaft, said shell having a recess therein, a shaft in said bearings, a frame in said recess, rollers at the ends of the frame, a wedge plate interposed between said frame and the shaft, said wedge plate having longitudinal grooves in its outer face, a wire spring located in said grooves, and bent at its ends gripping the shaft, substantially as described.

12. A shaft coupling comprising a shell having bearings therein to receive a shaft, said shell having a recess therein concentric with the bearings, a shaft in said bearings, a frame in the recess, rollers in the ends of the frame, and a wedge plate fitting the shaft and adapted to be moved circumferentially to wedge between the rollers of the frame and the shaft, said wedge plate having longitudinal grooves in its outer face, a wire spring located in said grooves, and bent at its ends gripping the shaft, substantially as described.

13. A shaft coupling comprising a shell having bearings therein to receive a shaft, said shell having a recess therein, a shaft in said bearings, a frame in said recess, rollers at the ends of the frame, a wedge plate interposed between said frame and the shaft, and a bearing block secured in said recess opposite the location of the wedge plate, whereby the latter presses the shaft against said block and said block alining with the bearings in the shell, substantially as described.

14. A shaft coupling comprising a shell having bearings therein to receive a shaft, said shell having a recess therein concentric with the bearings, a shaft in said bearings, a frame in the recess, rollers in the ends of the frame, a wedge plate fitting the shaft and adapted to be moved circumferentially to wedge between the rollers of the frame and the shaft, and a bearing block secured in said recess opposite the location of the wedge plate, whereby the latter presses the shaft against said block, and said block alining with the bearings in the shell, substantially as described.

15. A shaft coupling comprising a shell having bearings therein to receive a shaft, said shell having a recess therein, a shaft in the bearings, a frame in said recess, rollers at the ends of the frame, a wedge plate interposed between said frame and the shaft, means frictionally holding said wedge plate against the shaft, and a bearing block secured in said recess opposite the location of the wedge plate, whereby the latter presses the shaft against said block and said block alining with the bearings in the shell, substantially as described.

16. A shaft coupling comprising a shell having bearings therein to receive a shaft, and said shell having a recess therein concentric with the bearings, a shaft in said bearings, a frame in the recess, rollers in the ends of the frame, a wedge plate fitting the shaft and adapted to be moved circumferentially to wedge between the rollers of the frame and the shaft, means frictionally holding said wedge plate against the shaft, and a bearing block secured in said recess opposite the location of the wedge plate, whereby the latter presses the shaft against said block and said block alining with the bearings in the shell, substantially as described.

17. A shaft coupling comprising a shell having end and central bearings, shaft sections in said bearings, said shell having concentric recesses therein between the central bearings and the end bearings, frames in said recesses, rollers in the ends of said frames and wedge plates between the shafts and the roller frames, substantially as described.

18. A shaft coupling comprising a shell having end and central bearings, shaft sections in said bearings, said shell having concentric recesses therein between the central bearings and the end bearings, frames in said recesses, rollers in the ends of said frames, wedge plates between the shafts and the roller frames, and bearings blocks secured in the recesses against which the shafts bear, substantially as described.

In testimony whereof I have signed my name to this specification in the presence of two subscribing witnesses.

FRANK H. CATHCART.

Witnesses:
R. H. KRENKEL,
CHARLES E. POTTS.